US006965957B1

(12) United States Patent
Nguyen

(10) Patent No.: US 6,965,957 B1
(45) Date of Patent: Nov. 15, 2005

(54) AUTOMATIC CLUSTER JOIN PROTOCOL

(75) Inventor: Vy Nguyen, Hayward, CA (US)

(73) Assignee: 3PARdata, Inc., Fremont, CA (US)

( * ) Notice: Subject to any disclaimer, the term of this patent is extended or adjusted under 35 U.S.C. 154(b) by 317 days.

(21) Appl. No.: 10/194,685

(22) Filed: Jul. 12, 2002

(51) Int. Cl.[7] .............................................. G06F 13/00
(52) U.S. Cl. ..................... 710/100; 710/123
(58) Field of Search ................ 710/100, 123, 710/300–304, 240–244; 709/220–222; 370/254, 370/257

(56) References Cited

U.S. PATENT DOCUMENTS

| | | | | |
|---|---|---|---|---|
| 5,230,044 A | * | 7/1993 | Cao et al. .................... | 710/123 |
| 5,999,712 A | * | 12/1999 | Moiin et al. ................. | 709/220 |
| 6,108,699 A | | 8/2000 | Moiin | |
| 6,487,622 B1 | * | 11/2002 | Coskrey, IV et al. ....... | 710/241 |
| 2001/0056461 A1 | | 12/2001 | Kampe et al. | |
| 2002/0016867 A1 | | 2/2002 | Kampe et al. | |
| 2002/0042693 A1 | | 4/2002 | Kampe et al. | |

OTHER PUBLICATIONS

Windows 2000 Clustering Technologies: Cluster Service Architecture, White Paper, Microsoft Corporation, pp. 1-23.
Werner Vogels et al., "The Design and Architecture of the Microsoft Cluster Service", Paper, 10 pages.

* cited by examiner

Primary Examiner—Khanh Dang
(74) Attorney, Agent, or Firm—Patent Law Group LLP; David C. Hsia

(57) ABSTRACT

A method for new nodes to join a cluster in a serial sequence includes (a) a new node transmitting a first type of request to join the cluster and (b) the new node determining if it has to back off the first type of request. The new node has to back off if (1) it has received a second type of request to join the cluster from another new node, (2) it has received the first type of request with a higher sequence number from another new node, (3) it has received the first type of request with a lower node number from another new node, or (4) a member node of the cluster is in a busy state. The new node transmits the first type of request, receives the first type of request, and receives the second type of request through primary links to the new nodes and member nodes of the cluster.

31 Claims, 7 Drawing Sheets

AUTOMATIC CLUSTER JOIN PROTOCOL

FIELD OF THE INVENTION

This invention relates to a utility storage server having multiple controller nodes, and more particularly to a protocol for the controller nodes to join a cluster of the controller nodes.

DESCRIPTION OF RELATED ART

A utility storage server may be defined as any carrier-class storage system that supports multiple users or departments and provisions storage to multiple applications. The utility storage server may feature full fault-tolerance, security, and the ability to charge back individual users or departments for storage usage. To implement fault tolerance, a utility storage server uses clustering of multiple controller nodes to control many disk drives. Clustering is the use of two or more systems to work together to handle variable workloads or to provide continued operation in the event one fails. Thus, what is needed is a protocol that allows controller nodes to join a cluster in a utility storage server.

SUMMARY OF THE INVENTION

In one embodiment, a method for new nodes to join a cluster in a serial sequence includes (a) a new node transmitting a first type of request to join the cluster and (b) the new node determining if it has to back off the first type of request. The new node has to back off if (1) is has received a second type of request to join the cluster front another new node, (2) it has received the first type of request with a higher sequence number from another new node, (3) it has received the first type of request with a lower node number from another new node, or (4) a member node of the cluster is in a busy state. In one embodiment, the new node transmits the first type of request, receives the first type of request, and receives the second type of request through primary links to the new nodes and member nodes of the cluster.

In one embodiment if the new node does not have to back off, the method further includes (c) the new node determining if it has received votes from all member nodes of the cluster within a time period. If the new node has received the votes from all the member nodes, the method further includes (d) the new node transmitting a second type of request to join the cluster and (e) the new node determining if connectivity is complete among the member nodes and the new node. If the connectivity is complete, the method further includes (f) the new node and the member nodes integrating into the cluster. In one embodiment, the new node receives the votes from all the members, transmits the second type of request, and determines connectivity through primary links to the member nodes.

In one embodiment, the method further includes the new node transmitting a first type of signal indicating it is a new node. If the new node is receiving a second type of signal indicating another node is a member node, the method further includes the new node incrementing a signal counter. If the new node is receiving a third type of signal indicating another node is panicking, the method includes the new node decrementing the signal counter. If the signal counter is greater than zero, the method includes the new node transmitting a fourth type of signal indicating the cluster has at least one member node. If the signal counter is equal to zero, the method includes the new node transmitting the first type of signal. In one embodiment, the new node transmits the first type of signal, receives the second type of signal, receives the third type of signal, and transmits the fourth type of signal through backup links with the member nodes.

DETAILED DESCRIPTION

Figure 1A:
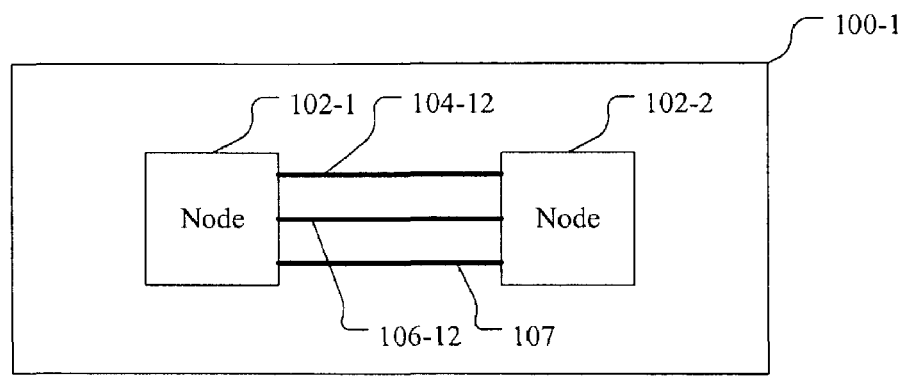
FIGS. 1A and 1B illustrate controller nodes of a utility storage server in two embodiments.

FIG. 1A illustrates controller nodes 102-1 and 102-2 of a utility storage server in one embodiment. Each controller node connects a host to a drive chassis housing hard disk drives. Nodes 102-1 and 102-2 can form a cluster 100-1 to provide disk access and failure protection. Controller nodes 102-1 and 102-2 are connected to each other by a primary link 104-12 and a backup link 106-12 in a one-to-one configuration. Controller nodes 102-1 and 102-2 are also connected by a serial bus 107 (e.g., an 12C bus). Each controller node is able to detect the power status (e.g., power on or power off) any other node through primary link 104-12. Each controller node is able to reset any other node (e.g., a cold reboot) through bus 107. For more information on the utility storage server, please see U.S. Pat. No. 6,658,478, entitled "Data Storage System" and U.S. patent application Ser. No. 09/883,681, entitled "Node Controller For A Data Storage System,"which are incorporated by reference in their entirety.

Figure 1B:
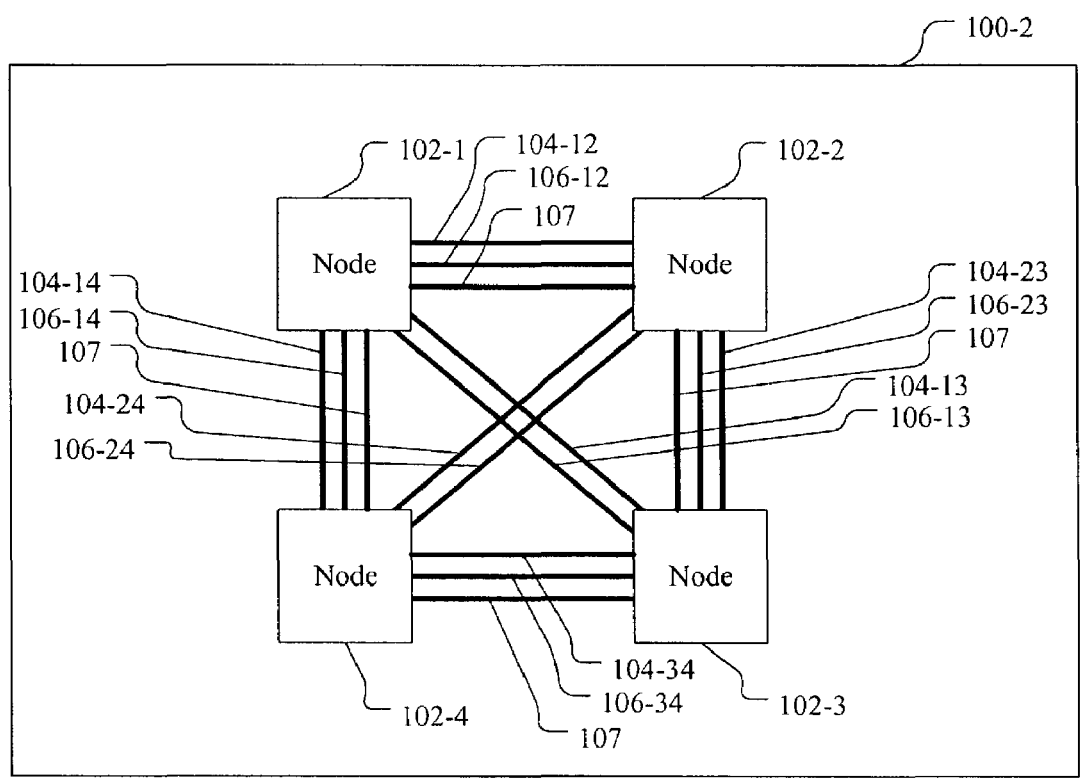

In other embodiments, the utility storage server contains a greater number of controller nodes that can form a cluster. For example, FIG. 1B illustrates four controller nodes 102-1, 102-2, 102-3, and 102-4 that form a cluster 100-2 in one embodiment. Each controller node is connected to the other controller nodes through primary and backup links in a one-to-one configuration. Specifically, (1) controller nodes 102-1 and 102-2 are connected by primary links 104-12 and backup link 106-12, (2) controller nodes 102-1 and 102-3 are connected by primary link 104-13 and backup link 106-13, (3) controller nodes 102-1 and 102-4 are connected by primary link 104-14 and backup link 106-14, (4) controller nodes 102-2 and 102-3 are connected by primary link 104-23 and backup link 106-23, (5) controller nodes 102-2 and 102-4 are connected by primary link 104-24 and backup link 106-24, and (6) controller nodes 102-3 and 102-4 are connected by primary link 104-34 and backup link 106-34. Additional, all the controller nodes are connected in series by bus 107. In another embodiment, the utility storage server contains eight controllers connected to each other through primary and backup links in a one-to-one configuration, and by bus 107 in a serial configuration.

Figure 1C:
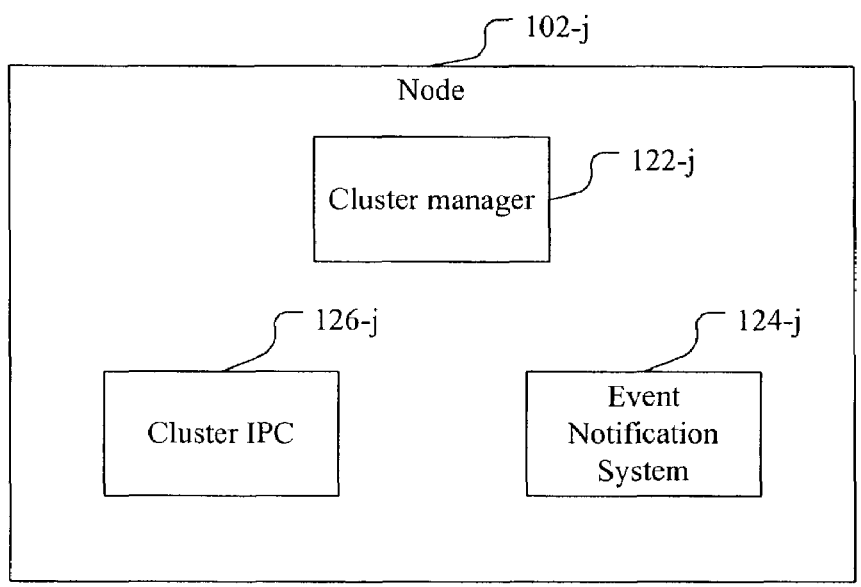
FIG. 1C illustrates cluster software in a controller node in one embodiment.

FIG. 1C illustrates cluster software on a controller node 102-j (where "j" is a variable) in one embodiment. The cluster software includes a cluster manager 122-j, a cluster event notification system 124-j; and a cluster inter-process communication (IPC) module 126-j. Cluster manager 122-j implements a protocol for new nodes to join a cluster of nodes. Cluster manager 122-j is described in more detail below. Cluster event notification system 124-j implements a protocol for a node to handle cluster events. Cluster event notification system 124-j is described in detail in U.S. patent application Ser. No. 10/194,710, entitled "Cluster Event Notification System," which is incorporated by reference in its entirety. IPC module 126-j implements a protocol for client-server process communication. IPC module 126-j is described in detail in U.S. patent application Ser. NO. 10/194,606, entitled "Cluster Inter-Process Communication (IPC) Transport," which is incorporated by reference in its entirety.

Figure 2:
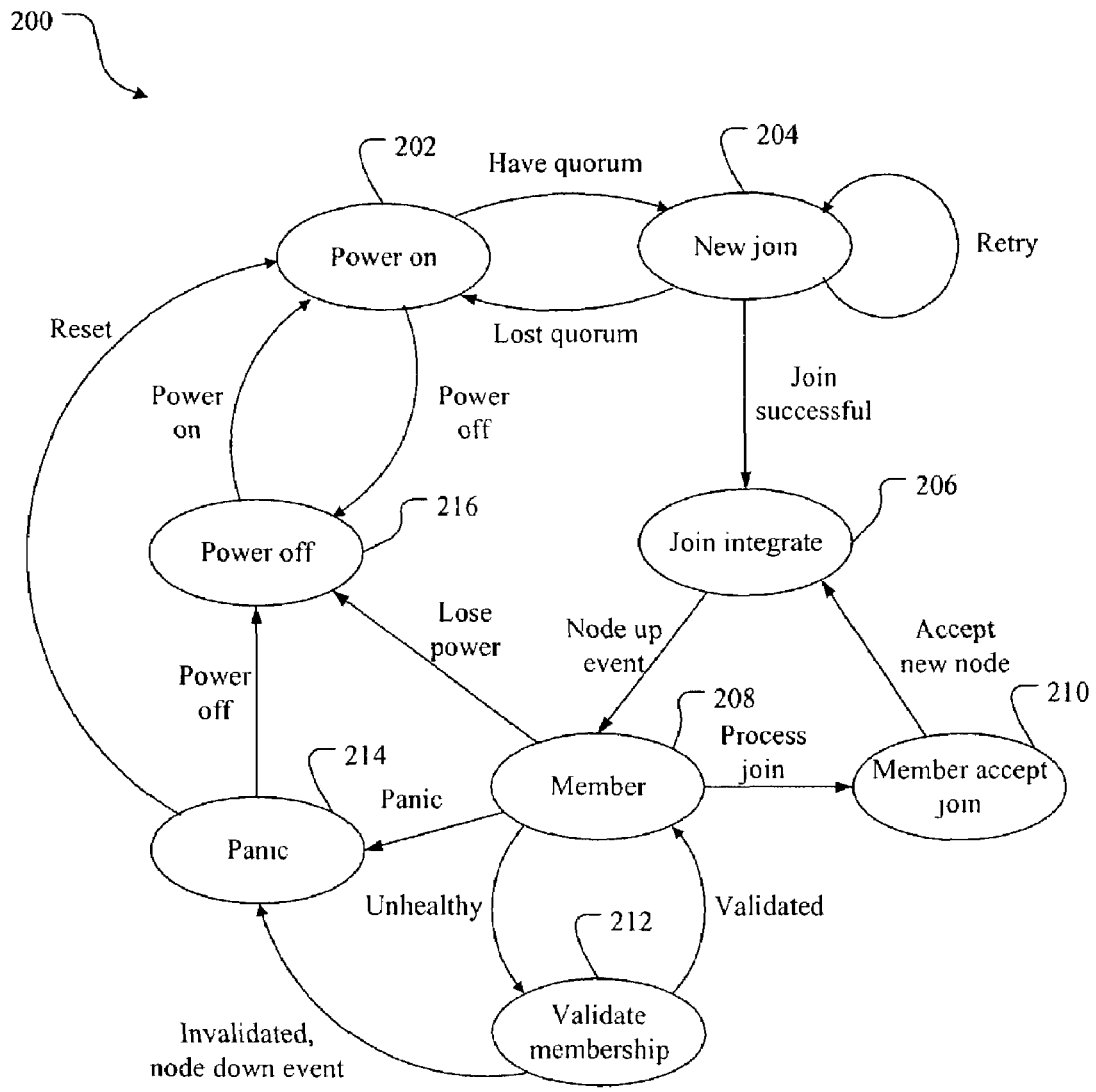
FIG. 2 illustrates a state diagram for each controller node to automatically join a cluster in a serial sequence in one embodiment.

FIG. 2 illustrates a state diagram 200 of each controller node 102-j under the control of cluster manager 122-j to automatically join a cluster 100-k (where "k" is a variable) in a serial sequence in one embodiment. State diagram 200 starts with node 102-j in state 202. In state 202, node 102-j powers on. If node 102-j has "quorum", then node 102-j advances to state 204. Quorum is defined as follows:

$$\text{quorum} = \text{number of primary link up} \geq \frac{\text{number of power on}}{2} + 1. \quad (1)$$

The number of primary link up indicates the number of other nodes that node 102-j can communicate with through their one-to-one primary links (after conventional setup such as handshaking and synchronization), including an internal link that node 102-j has to itself. The number of power on indicates the number of other nodes that node 102-j senses that are powered on through its primary link. Quorum is calculated with integer division where the fractional part (remainder) is discarded. If node 102-j loses power while in state 202, node 102-j advances to state 216.

In state 204, node 102-j attempts to join as a member of cluster 100-k. If node 102-j successfully joins cluster 100-k, node 102-j advances to state 206. If node 102-j does not successfully join cluster 100-k but does not lose quorum, node 102-j repeats its attempt to join as a member of cluster 100-k and stays instate 204. If node 102-j does not successfully join cluster 100-k and loses quorum, then node 102-j returns to state 202.

In state 206, node 102-j integrates into cluster 100-k. Integration is the conventional process in which node 102-j communicates with the other members to become a member of cluster 100-k. After node 102-j fully integrates into cluster 100-k, node 102-j advances to state 208. When a new node becomes part of cluster 100-k (e.g., a node up event), the cluster manager of each member node generates an event message to its event system. The event system then redistributes part of the cluster service provided by the member nodes to node 102-j.

In state 208, node 102-j is a member of cluster 100-k. If node 102-j receives a join request from a new node, then node 102-j advances to state 210. If node 102-j becomes "unhealthy", node 102-j advances to state 212. Node 102-j is unhealthy when it (1) cannot run an internal timer used to calculate timeouts, (2) cannot schedule a process (e.g., disk access), or (3) cannot communicate with the other member nodes. If node 102-j loses power in state 208, node 102-j advances to state 216. If node 102-j "panics", node 102-j advances to state 214. Node 102-j panics when the operating software (OS) of node 102-j has an error and fails to operate.

In state 210, node 102-j accepts the join request from the new node and advances to state 206 where node 102-j and the other member nodes integrate with the new node.

In state 212, node 102-j waits for the other member nodes to validate its membership. If node 102-j is validated by the other member nodes, node 102-j returns to slate 208 where node 102-j remains as a member of cluster 100-k. If node 102-j is not validated by the other member nodes, node 102-j advances to state 214. When a node is no longer a part of cluster 100-k (e.g., a node down event), the cluster manager of each surviving member node generates an event message to its event system. The event system may redistribute the cluster service provided by node 102-j among the surviving member nodes.

In state 214, node 102-j has panicked and waits to be reset or powered off. The master node of cluster 100-k will reset node 102-j after a timeout period. After being reset, node 102-j advances to state 202. Alternatively, a human operator powers off node 102-j and node 102-j advances to state 216.

In state 216, node 102-j is without power. When power returns, node 102-j powers itself back on and returns to state 202.

Figure 3B:
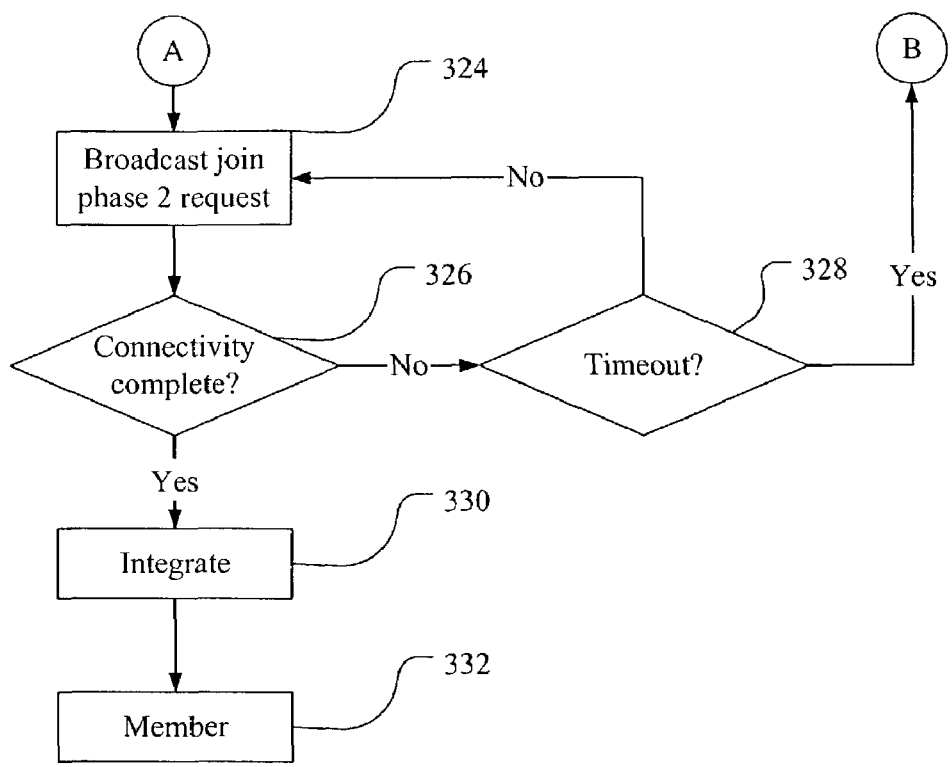
FIGS. 3A and 3B illustrate a method for the operation of a new node predominantly on its primary links to the other nodes in one embodiment.
Figure 3A:
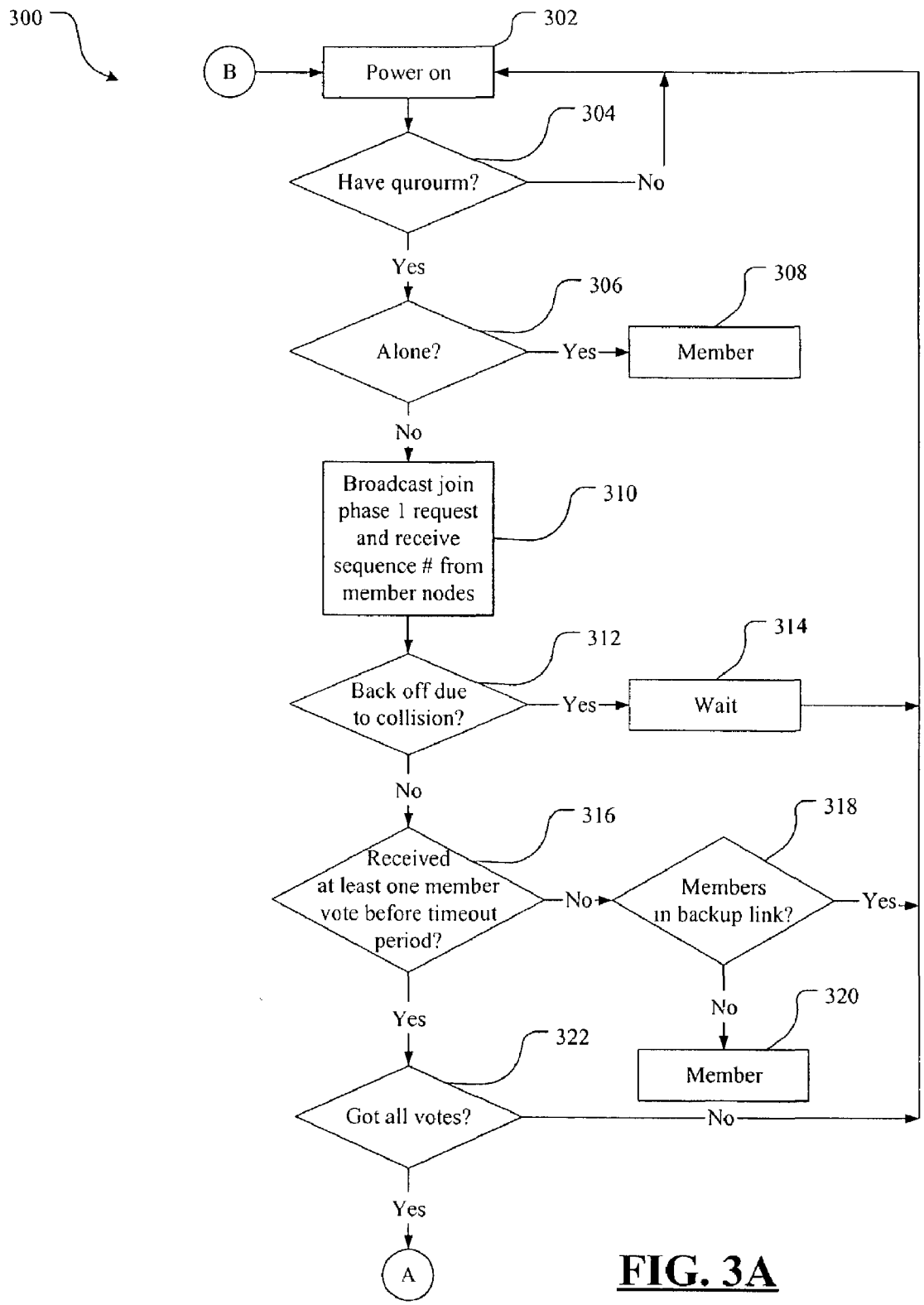

The actions of a new node in states 204, 206, 208, and 210 under the control of cluster manager 122-j are now described in more detail in reference to FIGS. 3A and 3B. FIGS. 3A and 3B illustrate a method 300 for the operation of a new node 102-j predominantly on its primary links. In action 302, node 102-j powers on.

In action 304, node 102-j determines if it has quorum. Node 102-j determines if it has quorum by detecting the power status of the other nodes from its primary links and the readiness of its primary links to communicate with the other nodes. Quorum has been defined above by formula I. If node 102-j has quorum, action 304 is followed by action 306. If not, action 304 is followed by action 302 and method 300 cycles until node 102-j has quorum.

In action 306, node 102-j determines if it is the only node that is powered on. If so, action 306 is followed by action 308. If node 102-j is not the only node that is powered on, action 306 is followed by action 310.

In action 308, node 102-j becomes a member of cluster 100-k. Since node 102-j is the only member of cluster 100-k, it is also the master of cluster 100-k. This action corresponds to state 208 of FIG. 2.

In action 310, node 102-j broadcasts a first type of request to join cluster 100-k hereafter referred to as "join phase 1 request" and receives a sequence number from member nodes. Phase 1 refers to a first phase in the protocol for new nodes to join cluster 100-k around the same time. In phase 1, one of the new nodes will determine by itself to advance to phase 2 (described later) of the protocol while the other new nodes will determine by themselves to wait for the next opportunity to advance to phase 2.

In action 312, node 102-j determines if it needs to back off its join request due to a collision with one or more concurrent join requests from other nodes. Node 102-j needs to back off when (1) another node is in phase 2, (2) a member node is in a busy state, (3) another node has a higher sequence number, and (4) another node has a lower node number.

Node 102-*j* knows another node is in phase 2 because it receives a second type of request to join cluster 100-*k* (hereafter "join phase 2 request) from the other node.

Node 102-*j* knows a member node is in the busy state when that member node replies to the join request with a busy status message. A member node is busy when: (1) it is participating in join integration of a new node; (2) it is validating the membership of a member node; or (3) when it is being validated by the other member nodes.

A sequence number is an incrementing number assigned to a node by member nodes when it communicates with the member nodes (e.g., broadcasts a join request). The sequence number is used by the node and the member nodes to identify each other in their communication. Two nodes may have the same sequence number when they both broadcast a request to the member nodes at the same time.

A node number is a unique number assigned to each node. For example, node 102-1 may be assigned a node number "1", node 102-2 may be assigned a node number "2", and so on If node 102-*j* detects a collision, action 312 is followed by action 314. If node 102-*j* does not detect a collision, action 312 is followed by action 316. Action 312 serializes the joining process by allowing only one node to join cluster 100-*k* a tone time. Each node decides on its own whether or not to proceed to phase 2 without intervention from a mater node or a human operator. In other words, neither a master node nor a human operator dictates which of the nodes proceed to phase 2.

In action 314, node 102-*j* waits for a timeout period. Action 314 is followed by action 302 and method 300 cycles through the steps described above.

In action 316, node 102-*j* determines if it has received at least one vote from a member node of cluster 100-*k* within a timeout period. If not, action 316 is followed by action 318. If node 102-*j* has received at least one vote from a member node within the timeout period, action 316 is followed by action 322.

In action 318, node 102-*j* determines if it detects any member node of cluster 100-*k* on its backup links. Node 102-*j* detects a member node by receiving a "signal M" or a "signal m" (both described later) on its backup links. If so, action 318 is followed by action 302 and method 300 cycles through the steps described above. If node 102-*j* does not detect any member node through its backup links, then action 318 is followed by action 320.

In action 320, node 102-*j* becomes a member of cluster 100-*k* because other new nodes have backed off and there are no member nodes. Since node 102-*j* is the only member of cluster 100-*k*, it is also the master node of cluster 100-*k*. This action corresponds to state 208 of FIG. 2.

In action 322, node 102-*j* determines if it has all the votes of the member nodes. If so, action 322 is followed by action 324 (FIG. 3B). If node 102-*j* did not get all the voles of the member nodes, then action 322 is followed by action 302 and method 300 cycles through the steps described above. Node 102-*j* does not get all the votes of the members when it times out or because the member nodes are busy.

In action 324, node 102-*j* broadcasts a second type of request to join cluster 100-*k* hereafter referred to as "join phase 2 request". Phase 2 refers to a second phase in the protocol for new nodes to join cluster 100-*k*. In phase 2, the remaining node from phase 1 and the member nodes will determine together whether the remaining node becomes a member node of cluster 100-*k*. The join request may include the local view of the membership used later to determine connectivity.

Figure 6:
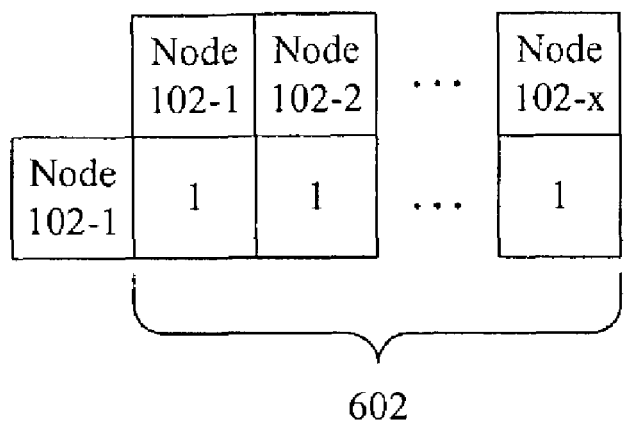
FIG. 6 illustrates a local view of the membership of the cluster in one embodiment.

In action 326, node 102-*j* determines if connectivity is completed among node 102-*j* and all member nodes. To determine connectivity among the nodes, node 102-*j* and member nodes exchange (e.g., broadcasts over their primary links) their own local views of the membership. In one embodiment, each node records their local view of the membership as a row 602 (FIG. 6) of data where a connection is recorded with a 1 bit and a disconnect is recorded with a 0 bit. From its own local view and the local views of the node members, node 102-*j* constructs a matrix 702 of the local views to form a global view of the membership. Each row of matrix 702 is a local view of the membership of a node. Connectivity is completed when the global view of the membership indicates that all the node members including node 102-*j* have their primary link connected and ready for communication. Thus, node 102-*j* and the member nodes together determines if node 102-j can join cluster 100-*k* by exchanging their local views of the membership to determine a global view of membership. If node 102-*j* determines connectivity is complete, action 326 is followed by action 330. If not, then action 326 is followed by action 328.

In action 328, node 102-*j* determines if it has timed out. If so, action 328 is followed by action 302 and method 300 cycles as described above. If node 102-*j* has not timed out, then action 328 is followed by action 324 where node 102-*j* again broadcasts its join phase 2 request.

In action 330, node 102-*j* integrates with the other member nodes into cluster 100-*k*. Action 330 corresponds to state 206 of FIG. 2 as described above.

In action 332, node 102-*j* is a member of cluster 100-*k*. Action 332 corresponds to state 208 of FIG. 2 as described above.

Figure 4:
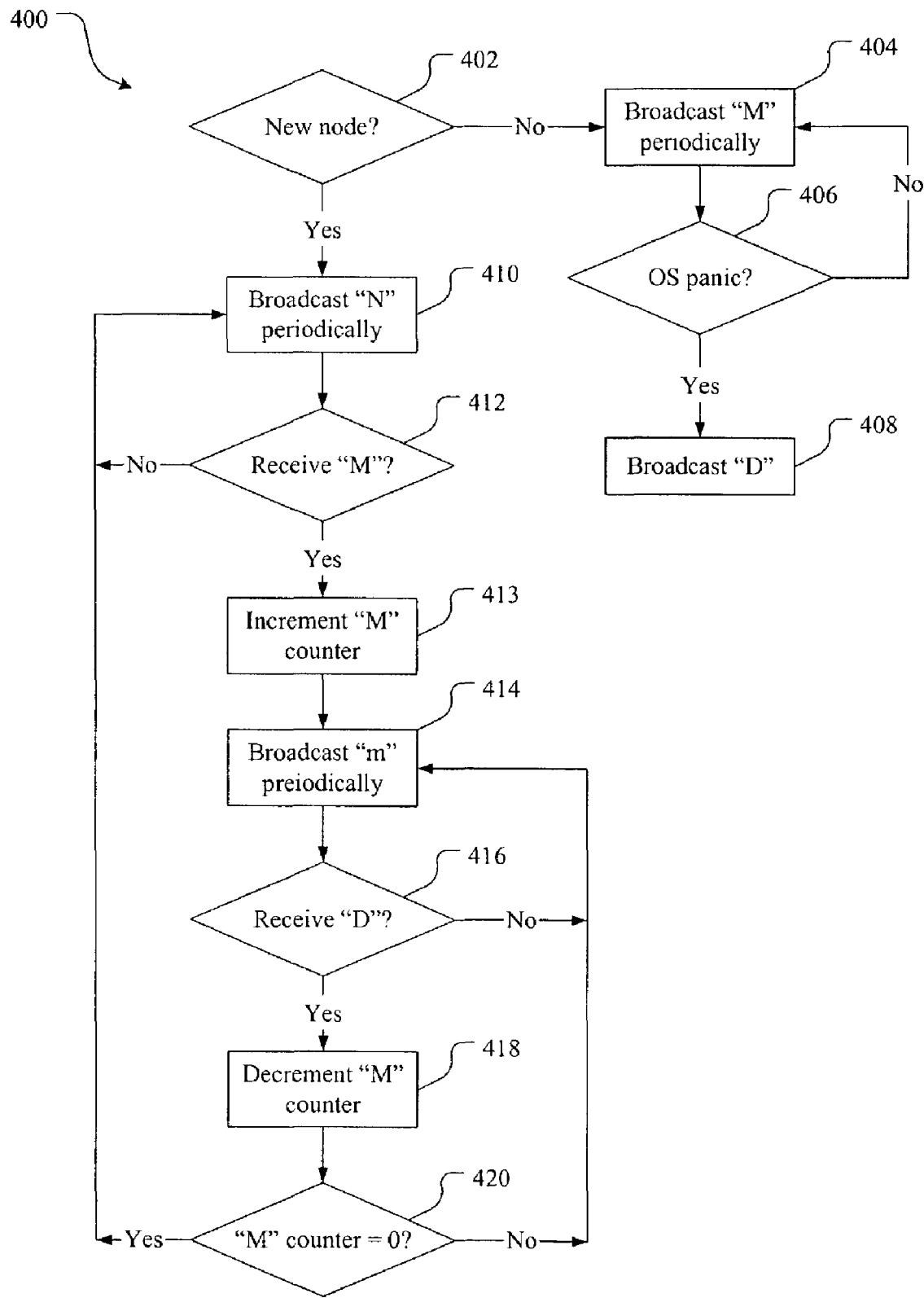
FIG. 4 illustrates a method for the operation of a new node on its backup links in one embodiment.

The actions of each node (including new nodes and member nodes) in states 204, 206, 208, and 210 under the control of cluster manager 122-*j* are now described in more detail in reference to FIG. 4. FIG. 4 illustrates a method 400 for the operation of a node 102-*j* on its backup links. These actions are pertinent to action 318 above where a new node determines if there are member nodes in cluster 100-*k* through its backup link.

In action 402, node 102-*j* determines if it is a new node. If so, action 402 is followed by action 410. If node 102-*j* is a member node and not a new node, then action 402 is followed by action 404.

In action 404, node 102-*j* broadcasts a first type of signal (hereafter "signal M") periodically to other connected nodes. Signal M indicates that node 102-*j* is a member node.

In action 406, node 102-*j* determines if there is an OS panic. If so, action 406 is followed by action 408. If there is no OS panic, then action 406 is followed by action 404.

In action 408, node 102-*j* broadcasts a second type of signal (hereafter "signal D"). Signal D indicates that node 102-*j* has an OS panic. As described above, a master node may reset the panicked node or a human operator could power off the panicked mode.

In action 410, node 102-*j* broadcasts a third type of signal (hereafter "signal N") periodically. Signal N indicates that node 102-*j* is a new node.

In action 412, node 102-*j* determines if it has received a signal M from any other node. If so, action 412 is followed by action 414. If node 102-*j* has not received a signal M from any other node, then action 412 is followed by action 410 and method 400 cycles until node 102-*j* receives a signal M.

In action 413, node 102-*j* increments a signal M counter that was initialized to start at 0. The signal M counter indicates how many member nodes that node 102 *j* is aware of through its backup links. In action 414, node 102-*j* broadcasts a fourth type of signal (hereafter "signal m") periodically. Signal m indicates to other nodes that node 102-*j* is aware there is at least one member node it is connected to.

In action 416, node 102-*j* determines if it has received a signal D from any other node. If so, action 416 is followed by action 418. If node 102-*j* has not received a signal D, then action 416 is followed by action 414 and method 400 cycles until node 102-*j* receives a signal D.

In action 418, node 102-*j* decrements the signal M counter to correctly represent the number of member nodes it is aware of through its backup link.

In action 420, node 102-*j* determines if the count of signal M counter is equal to 0, which indicates there are no member nodes in cluster 100-*k*. If so, action 420 is followed by action 410 where node 102-*j* again broadcasts signal N. If node 102-*j* determines the count of signal M counter is not equal to 0, then action 420 is followed by action 414 where node 102-*j* continues to broadcast signal m.

Figure 5:
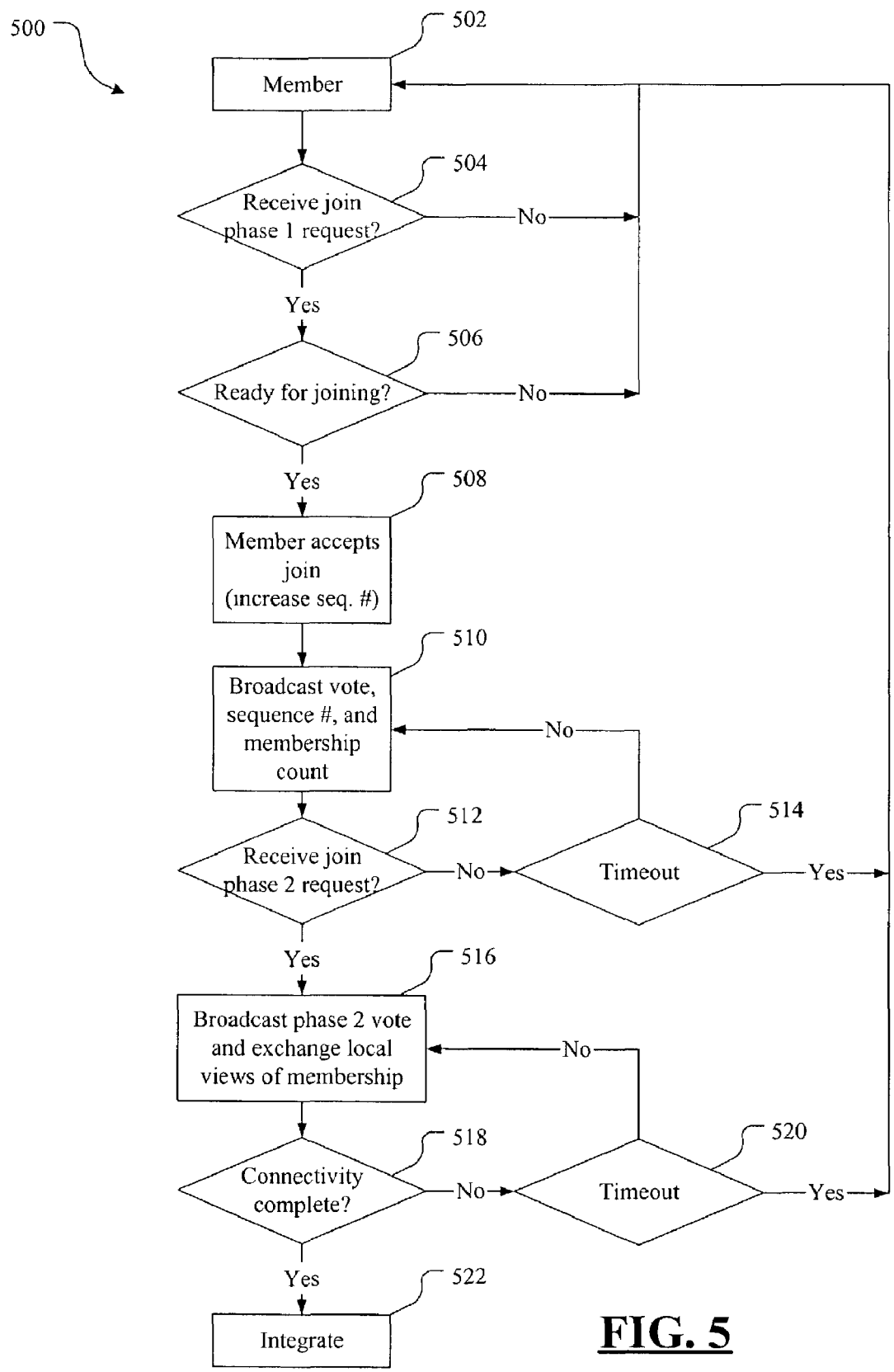
FIG. 5 illustrates a method for the operation of a member node on its primary links to the other nodes in one embodiment.

The actions of a member node in states 204, 206, 208, and 210 under the control of cluster manager 122-*j* are now described in more detail in reference to FIG. 5. FIG. 5 illustrates a method 500 for the operation of a member node 102-*j* on its primary links.

In action 502, node 102-*j* is a member node. In action 504, node 102-*j* determines if it receives a join phase 1 request from a new node. If so, action 504 is followed by action 506. If node 102-*j* does not receive a join phase 1 request, action 504 is followed by action 502 and method 500 cycles until node 102-*j* receives a join phase 1 request.

In action 506, node 102-*j* determines if it is ready for the new node to join cluster 100-*k*. If so, action 506 is followed by action 508. If it is not ready, action 506 is followed by action 502 and method 500 cycles as described above. Node 102-*j* may not be ready for the new node to join cluster 100-*k* if it is integrating into cluster 100-*k*, validating another member node, or being validated by other member nodes.

In action 508, node 102-*j* accepts the join phase 1 request and increases the sequence number for communication with the new node.

In action 510, node 102-*j* broadcasts its phase 1 vote to accept the new node, the increased sequence number, and its membership count. Membership count is used by the new node to tell how many members there are and if it has received all the votes in action 322 of FIG. 3A as described above.

In action 512, node 102-*j* determines if it has received a join phase 2 request from the new node. If so, action 512 is followed by action 516. If node 102-*j* has not received a join phase 2 request, action 512 is followed by action 514.

In action 514, node 102-*j* determines if it has timed out. If so, action 514 is followed by action 502 and method 500 cycles as described above. If node 102-*j* has not timed out, then action 514 is followed by action 510 where node 102-*j* again broadcasts its vote and membership view.

In action 516, node 102-*j* broadcasts its phase 2 vote and its local view of the membership (e.g., row 602 in FIG. 6) to accept the new node.

Figure 7:
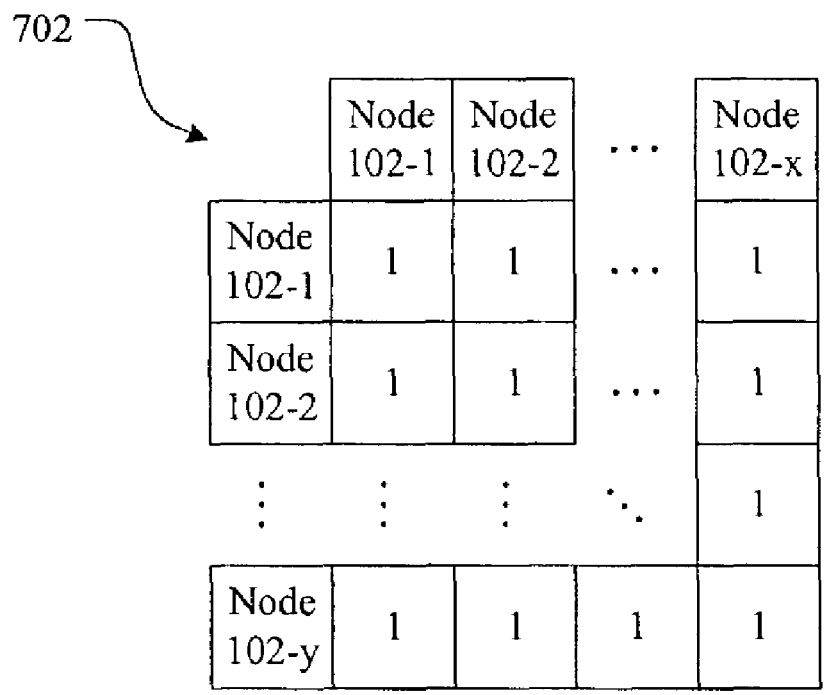
FIG. 7 illustrates a global view of the membership of the cluster in one embodiment.

In action 518, node 102-*j* determines if connectivity is completed among all member nodes and the new node. Action 518 is similar to action 326 of FIG. 3 described above where node 102-*j* constructs a global view of the membership (e.g., matrix 702 in FIG. 7) to determine connectivity. If connectivity is completed, then action 518 is followed by action 522. If not, action 518 is followed by action 520.

In action 520, node 102-*j* determines if it has timed out. If so, action 520 is followed by action 502 and method 500 cycles as described above. If node 102-*j* has not timed out, then action 520 is followed by action 516 and method 500 cycles as described above.

In action 522, node 102-*j* integrates with the other members into cluster 100-*k*. Action 522 corresponds to state 206 of FIG. 2 as described above.

Various other adaptations and combinations of features of the embodiments disclosed are within the scope of the invention. Numerous embodiments are encompassed by the following claims.

What is claimed is:

1. A method for new nodes to join a cluster in a serial sequence, comprising:
   transmitting by a new node a first type of request to join the cluster;
   determining by the new node if it has to back off the first type of request;
   if the new node does not have to back off, determining by the new node if it has received votes from all member nodes of the cluster within a time period;
   if the new node has received the votes from all the member nodes, transmitting by the new node a second type of request to join the cluster;
   determining by the new node if connectivity is complete among the member nodes and the new node;
   if the connectivity is complete, integrating by the new node and the member nodes into the cluster.

2. The method of claim 1, wherein the new node receives the votes and transmits the second type of request through primary links with the member nodes of the cluster.

3. The method of claim 1, wherein said determining by the new node if connectivity is complete among the member nodes and the new node comprises:
   transmitting by the new node a local view of a membership to the member nodes;
   receiving by the new node local views of the membership from the member nodes;
   constructing by the new node a global view of the membership from the local view and the local views of the member node;
   determining by the new node if all the member nodes and the new node are connected from the global view of the membership.

4. The method of claim 3, wherein the new node transmits the local view and receives the local views through primary links with the member nodes.

5. The method of claim 1, further comprising transmitting by the new node a first type of signal indicating it is a member node.

6. The method of claim 5, further comprising transmitting by the new node a second type of signal indicating the new node is panicking when the new node panics.

7. The method of claim 6, wherein the new node transmits the first type of signal and the second type of signal through backup links with the member nodes.

8. The method of claim 1, wherein the new node has to back off upon detecting an event selected from the group consisting of: (1) the new node has received a second type of request to join the cluster from another node, (2) another node has transmitted the first type of request with a higher sequence number, (3) another node has transmitted the first type of request with a lower node number, and (4) a member node of the cluster is in a busy state.

9. A method for new nodes to join a cluster in a serial sequence, comprising:
   (a) transmitting by a new node a first type of request to join the cluster;

(b) determining by the new node if it has to back off the first type of request;

(c) if the new node does not have to back off, determining by the new node if it has received at least one vote from member nodes of the cluster within a time period;

(d) if the new node has not received at least one vote from the member nodes within the time period, determining by the new node if the cluster has any member nodes;

(e) if the cluster has member nodes, repeating actions (a) and (b);

(f) if the cluster does not have any member nodes, becoming a master node by the new node.

10. The method of claim 9, wherein the new node receives the at least one vote through one primary link with one member node of the cluster.

11. The method of claim 9, wherein in the new node determines if the cluster has any member nodes by detecting a signal on one backup link with another node, the signal indicating the cluster has at least one member code.

12. The method of claim 9, wherein the new node has to back off upon detecting an event selected from the group consisting of (1) the new node has received a second type of request to join the cluster from another node, (2) another node has transmitted the first type of request with a higher sequence number, (3) another node has transmitted the first type of request with a lower node number, and (4) a member node of the cluster is in a busy state.

13. A method for new nodes to join a cluster in a serial sequence, comprising:

transmitting by a new node a first type of request to join the cluster;

determining by the new node if it has to back off the first type of request;

transmitting by the new node a first type of signal indicating it is a new node;

incrementing by the new node a signal counter if it is receiving a second type of signal indicating another node is a member node;

decrementing by the node the signal counter if it is receiving a third type of signal indicating another node is panicking;

transmitting by the node a fourth type of signal indicating the cluster has at least one member node if the signal counter is greater than zero;

transmitting by the node the first type of signal if the signal counter is equal to zero.

14. The method of claim 13, wherein the new node transmits the first type of signal, receives the second type of signal, receives the third type of signal, and transmits the fourth type of signal through backup links with the member nodes.

15. A method for a new node to communicate with member nodes of a cluster, comprising:

transmitting by the new node a fast type of signal indicating it is a new node;

incrementing by the new node a signal counter if it is receiving a second type of signal indicating another node is a member node;

decrementing by the new node the signal counter if it is receiving a third type of signal indicating another node is panicking;

transmitting by the new node a fourth type of signal indicating the cluster has at least one member node if the signal counter is greater than zero;

transmitting by the new node the first type of signal if the signal counter is equal to zero.

16. The method of claim 15, wherein the new node transmits the first type of signal, receives the second type of signal, receives the third type of signal, and transmits the fourth type of signal through backup links with the member nodes.

17. The method of claim 16, further comprising:

(a) transmitting by the new node a first type of request to join the cluster, and (b) determining by the new node if it has to back off the first type of request.

18. The method of claim 17, wherein the new node transmits the first type of request through primary links with the member nodes.

19. The method of claim 17, wherein the new node has to back off if (1) it has received a second type of request to join the cluster from another node, (2) another node has transmitted the first type of request with a higher sequence number, (3) another node has transmitter the first type of request with a lower node number, or (4) a member node of the cluster is in a busy state.

20. The method of claim 19, wherein the member node is in a busy state if (1) it is integrating into the cluster, (2) it is validating another member node, or (3) it is being validated by other member nodes.

21. The method of claim 17, further comprising:

(c) if the new node does not have to back off, determining by the new node if it has received votes from all member nodes within a time period;

(d) if the new node has received the votes from all the member nodes, transmitting by the new node a second type of request to join the cluster;

(e) determining by the new node if connectivity is complete among the member nodes and the new node;

(f) if the connectivity is complete, integrating by the new node and the member nodes into the cluster.

22. The method of claim 21, wherein the new node receives the votes and transmits the second type of request through primary links with other nodes including the member nodes of the cluster.

23. The method of claim 21, wherein said determining by the new node if connectivity is complete among the member nodes and the new node comprises:

transmitting by the new node a local view of a membership to the member nodes;

receiving by the new node local views of the membership from the member nodes;

constructing by the new node a global view of the membership from the local view and the local views of the member node;

determining by the new node if all the member nodes and the new node are connected from the global view of the membership.

24. The method of claim 23, wherein the new node transmits the local view and receives the local views through primary links with the member nodes.

25. The method of claim 23, further comprising transmitting by the new node the second type of signal to indicate it is a member node.

26. The method of claim 25, further comprising transmitting by the now node the third type of signal to indicate it is panicking.

27. The method of claim 26, wherein the new node transmits the second type of signal and the third type of signal through backup links with the member nodes.

28. The method of claim 17, further comprising:
(c) if the new node does not have to back off, determining by the new node if it has received at least one vote from member nodes within a time period;
(d) if the new node has not received at least one vote from the member nodes within the time period, determining by the new node if the cluster has any member nodes;
(e) if the cluster has member nodes, repeating actions (a) and (b);
(f) if the cluster does not have any member nodes, becoming a master node by the new node.

29. The method of claim 28, wherein the new node receives the at least one vote through one primary link with one member node of the cluster.

30. The method of claim 29, wherein the new node determines if the cluster has any member nodes by detecting the fourth type of signal on one backup link with another node.

31. The method of claim 13, wherein the new node has to back off upon detecting an event selected from the group consisting of (1) the new node has received a second type of request to join the cluster from another node, (2) another node has transmitted the first type of request with a higher sequence number, (3) another node has transmitted the first type of request with a lower node number, and (4) a member node of the cluster is in a busy state.

* * * * *